(12) United States Patent
Liu et al.

(10) Patent No.: US 10,280,549 B2
(45) Date of Patent: May 7, 2019

(54) WASHING MACHINE DRIVER

(71) Applicant: CHANGZHOU XINYA ELECTROMOTOR CO., LTD., Changzhou (CN)

(72) Inventors: Xiaohui Liu, Changzhou (CN); Sergio Luis Marsiglia Sobreira, Changzhou (CN)

(73) Assignee: Changzhou Xinya Electromotor Co., Ltd., Changzhou (CN)

( * ) Notice: Subject to any disclaimer, the term of this patent is extended or adjusted under 35 U.S.C. 154(b) by 40 days.

(21) Appl. No.: 15/537,583

(22) PCT Filed: Dec. 15, 2015

(86) PCT No.: PCT/CN2015/097417
§ 371 (c)(1),
(2) Date: Jun. 19, 2017

(87) PCT Pub. No.: WO2016/101806
PCT Pub. Date: Jun. 30, 2014

(65) Prior Publication Data
US 2018/0266033 A1    Sep. 20, 2018

(30) Foreign Application Priority Data
Dec. 23, 2014    (CN) .......................... 2014 1 0811969

(51) Int. Cl.
*D06F 23/04*    (2006.01)
*D06F 37/40*    (2006.01)
(Continued)

(52) U.S. Cl.
CPC ............. *D06F 37/30* (2013.01); *F16D 27/04* (2013.01); *F16H 1/2809* (2013.01);
(Continued)

(58) Field of Classification Search
CPC .......... D06F 37/30; D06F 37/36; D06F 37/40; F16H 1/2809; F16H 3/66; F16H 3/666;
(Continued)

(56) References Cited

U.S. PATENT DOCUMENTS 5,887,458 A    3/1999  Bae
2004/0139768 A1*  7/2004  Kim ...................... D06F 37/304
                                                              68/12.24
(Continued)

FOREIGN PATENT DOCUMENTS

CN    201896253 U    7/2011
CN    104452192 A    3/2015
(Continued)

OTHER PUBLICATIONS

First Office Action issued in Korean Counterpart Application No. 10-2017-7018753, dated Mar. 20, 2018, 8 pp.
(Continued)

*Primary Examiner* — Justin Holmes
*Assistant Examiner* — Lillian T Nguyen
(74) *Attorney, Agent, or Firm* — Fitch, Even, Tabin & Flannery LLP

(57) ABSTRACT

A drive device for a washing machine includes a motor, a washing shaft, a dewatering shaft sleeve sleeved on the washing shaft, the washing shaft is coaxially installed in a rotor of the motor, and further includes a planetary gear speed reduction mechanism built in the rotor and the planetary gear speed reduction mechanism includes: a sun-gear sleeve sleeved on the washing shaft and fixedly connected to the rotor; a planetary gear assembly, including a planetary gear meshing with the sun-gear sleeve, and the planetary gear assembly is fixedly connected to the washing shaft via a planetary carrier; the number of the planetary gear is plural, and the multiple planetary gears are evenly distrib-
(Continued)

uted about the sun-gear sleeve; and an internally toothed ring gear meshing with the planetary gears and fixedly connected to the dewatering shaft sleeve.

20 Claims, 6 Drawing Sheets

(51) Int. Cl.
*F16D 27/04* (2006.01)
*D06F 37/30* (2006.01)
*F16H 1/28* (2006.01)

(52) U.S. Cl.
CPC .. *F16D 2300/14* (2013.01); *F16D 2500/1022* (2013.01); *F16D 2500/1087* (2013.01)

(58) Field of Classification Search
CPC ............. F16D 27/04; F16D 2500/1087; F16D 2300/14; F16D 2500/1022
See application file for complete search history.

(56) References Cited

U.S. PATENT DOCUMENTS

| | | | |
|---|---|---|---|
| 2005/0166643 A1* | 8/2005 | Cho | .................... D06F 37/304 68/12.02 |
| 2016/0222572 A1* | 8/2016 | Kim | ...................... D06F 37/40 |

FOREIGN PATENT DOCUMENTS

| | | |
|---|---|---|
| KR | 100126078 | 12/1997 |
| KR | 100264120 | 8/2000 |
| KR | 100962073 B1 | 6/2010 |

OTHER PUBLICATIONS

State Intellectual Property Office of the P.R. China, International Search Report Issued in International Application No. PCT/CN2015/097417, dated Mar. 26, 2016, 14 pp.

* cited by examiner

WASHING MACHINE DRIVER

This application is the national phase of International Application No. PCT/CN2015/097417, titled "WASHING MACHINE DRIVER", filed on Dec. 15, 2015, which claims the benefit of priority to Chinese Patent Application No. 201410811969.7 titled "DRIVE DEVICE FOR WASHING MACHINE", filed with the Chinese State Intellectual Property Office on Dec. 23, 2014, the entire disclosures of which are incorporated herein by reference.

FIELD

The present application relates to the technical field of drive devices, and more particularly to a drive device for a washing machine.

BACKGROUND

Washing machines are common household electrical appliances in daily life, and main operation modes of the washing machine may be classified into a washing working condition and a dewatering working condition.

Reference is made to FIG. 1, which is a schematic view showing the structure of a conventional drive device of a washing machine.

As illustrated in the drawing, the drive device for the washing machine includes a motor, a washing shaft 12 coaxially mounted in a motor rotor 11, and a dewatering shaft sleeve 13 sleeved on the washing shaft 12. The washing shaft 12 and the motor rotor 11 are rotatable with respect to each other, and the dewatering shaft sleeve 13 and the washing shaft 12 are rotatable with respect to each other.

The drive device for the washing machine further includes a gear speed reduction mechanism eccentrically installed in the motor rotor 11. The gear speed reduction mechanism includes an input gear shaft 14, a first gear 15, a second gear 16, a middle gear 17 and an output gear 18. The input gear shaft 14 is eccentrically inserted in the motor rotor 11, and is rotatable with respect to the motor rotor 11. The first gear 15 and the second gear 16 are fixedly mounted at two ends of the input gear shaft 14 respectively, the middle gear 17 is sleeved on the dewatering shaft sleeve 13, and the output gear 18 is fixedly connected to the washing shaft 12. The first gear 15 meshes with the middle gear 17, and the second gear 16 meshes with the output gear 18.

In operation, the motor drives the motor rotor 11 to rotate, and at the same time drives the input gear shaft 14 as well as the first gear 15 and the second gear 16 both fixedly mounted to the input gear shaft 14 to revolve. The first gear 15 meshes with the middle gear 17 and there is a difference between the number of teeth of the first gear 15 and the number of teeth of the middle gear 17, thus the input gear shaft 14 can also be driven to rotate on its own axis. Further, the output gear 18 is driven to rotate through the engagement between the second gear 16 and the output gear 18, and finally, the washing shaft 12 fixedly connected to the output gear 18 is driven to rotate. Due to the differences in the numbers of teeth of the gears, a rotation speed difference may be generated between the output gear 18 and the motor rotor 11, to thereby driving the washing shaft 12 to output at a low speed. The middle gear 17 is sleeved on the dewatering shaft sleeve 13 and is in a non-fixed state, therefore, while the washing shaft 12 outputs at a low speed, the dewatering shaft sleeve 13 also outputs at a low speed at a certain speed ratio.

However, the above drive device for the washing machine has the following issues.

Since the gear speed reduction mechanism is eccentrically installed in the motor rotor 11, power is inputted into the input gear shaft 14 eccentrically arranged, and then transmitted to the washing shaft 12, which reduces the working efficiency, and cannot achieve an idea output efficiency. In addition, the gear speed reduction mechanism being eccentrically installed in the motor rotor 11 is apt to cause the unsmooth operation of the motor rotor 11, reduces the working performance of the motor rotor 11, and is not good for improving the performance of the whole machine.

Therefore, a technical issue to be addressed by the person skilled in the art at present is to improve a drive device for the washing machine, to enable the drive device to have a high efficiency and enable the whole machine to have a stable performance.

SUMMARY

An object of the present application is to provide a drive device for a washing machine, which has a high operation efficiency and enables the whole machine to have a stable performance.

To address the above technical issue, a drive device for a washing machine is provided according to the present application, which includes a motor, a washing shaft, a dewatering shaft sleeve sleeved on the washing shaft, the washing shaft is coaxially installed in a rotor of the motor, and the drive device further includes a planetary gear speed reduction mechanism built in the rotor and the planetary gear speed reduction mechanism includes:

a sun-gear sleeve sleeved on the washing shaft and fixedly connected to the rotor;

a planetary gear assembly, including a planetary gear meshing with the sun-gear sleeve, and wherein the planetary gear assembly is fixedly connected to the washing shaft via a planetary carrier; the number of the planetary gear is plural, and the multiple planetary gears are evenly distributed about the sun-gear sleeve; and an internally toothed ring gear meshing with the planetary gears and fixedly connected to the dewatering shaft sleeve.

In the drive device for the washing machine, the planetary gear speed reduction mechanism is built in the rotor, that is, the rotor has a hollow structure and the multiple planetary gears are evenly distributed in the rotor, and the sun gear of the planetary gear speed reduction mechanism is configured as a gear sleeve, which is sleeved on the washing shaft and also fixedly connected to the rotor. In this way, the planetary gear speed reduction mechanism is coaxial with the rotor, which ensures the smoothness of the operation of the rotor, and ensures that power can be inputted and outputted coaxially, thus the working efficiency is higher. In addition, compared with the background technology, in the present application, the planetary gear speed reduction mechanism is built in the rotor, thus the overall structure is more compact, and the axial dimension is reduced. In addition, the gears has a large contact area, multiple planetary gears can bear the load together, which effectively disperses the gear surface pressure, and can increase the reliability of the operation of the planetary gear speed reduction mechanism.

Optionally, a ring gear retaining sleeve is provided between the rotor and the internally toothed ring gear.

Optionally, an oil-retaining bearing is provided between the ring gear retaining sleeve and the sun-gear sleeve.

Optionally, a mounting plate is fixedly arranged above the motor, and a double bearing is provided between the mounting plate and the dewatering shaft sleeve.

Optionally, the drive device further includes a clutch device, to achieve a switch between a washing working condition and a dewatering working condition.

Optionally, the clutch device has a clutch disc connected to the internally toothed ring gear by a spline sleeve, and the clutch disc meshes with the spline sleeve, and is axially slidably connected to the spline sleeve.

Optionally, in the dewatering working condition, the clutch disc is engaged with the rotor.

Optionally, the clutch device is an electromagnetic clutch device.

Optionally, when the electromagnetic clutch device is energized, the clutch disc is engaged with the rotor.

Figure 1:
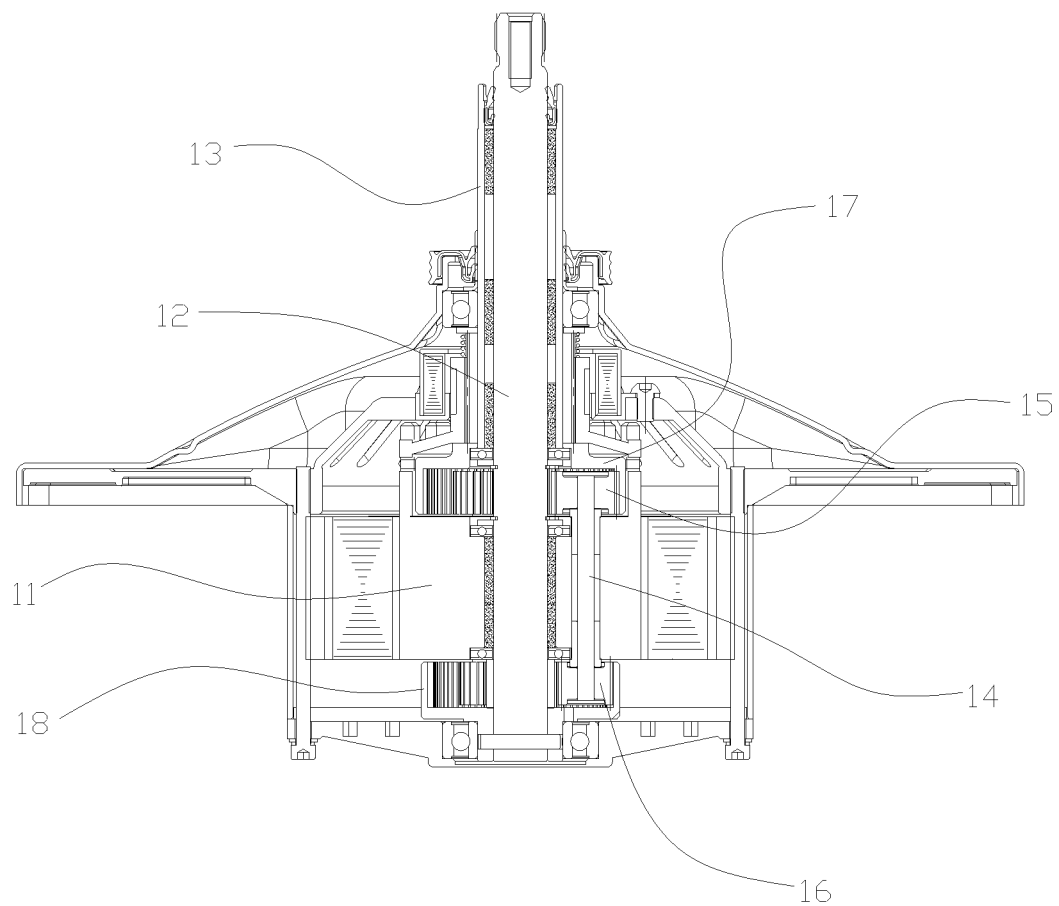
FIG. 1 is a schematic view showing the structure of a conventional drive device for the washing machine.

Reference Numerals in FIG. 1:

| 11 | motor rotor, | 12 | washing shaft, |
|----|----|----|----|
| 13 | dewatering shaft sleeve, | 14 | input gear shaft, |
| 15 | first gear, | 16 | second gear, |
| 17 | middle gear, | 18 | output gear. |

Reference Numerals in FIGS. 2 to 6:

| 20 | motor, | 21 | stator, |
|----|----|----|----|
| 22 | rotor, | 221 | rotor body, |
| 222 | rotor upper end cover, | 223 | rotor lower end cover; |
| 31 | sun-gear sleeve, | 32 | planetary gear assembly, |
| 321 | planetary carrier, | 322 | planet pin, |
| 323 | planetary gear, | 33 | internally toothed ring gear, |
| 34 | ring gear retaining sleeve, | 35 | oil-retaining bearing; |
| 41 | washing shaft, | 42 | dewatering shaft sleeve, |
| 43 | double bearing; | 50 | clutch device, |
| 51 | clutch disc; | 61 | bottom cover, |
| 62 | mounting plate. | | |

DETAILED DESCRIPTION

A core of the present application is to provide a drive device for a washing machine, which has a high working efficiency and enables the whole machine to have a stable performance.

In order to make the person skilled in the art to better understand the solution of the present application, the present application is further described in detail with reference to the drawings and embodiments.

It is to be noted that, the locality terms herein such as upper, lower are defined by the positions of parts and components in the FIGS. 2 to 6 and the positional relationship between the parts and components, and are only for describing the technical solution clearly and conveniently. It should be appreciated that, the locality terms employed herein should not limit the scope claimed by the present application.

Figure 2:
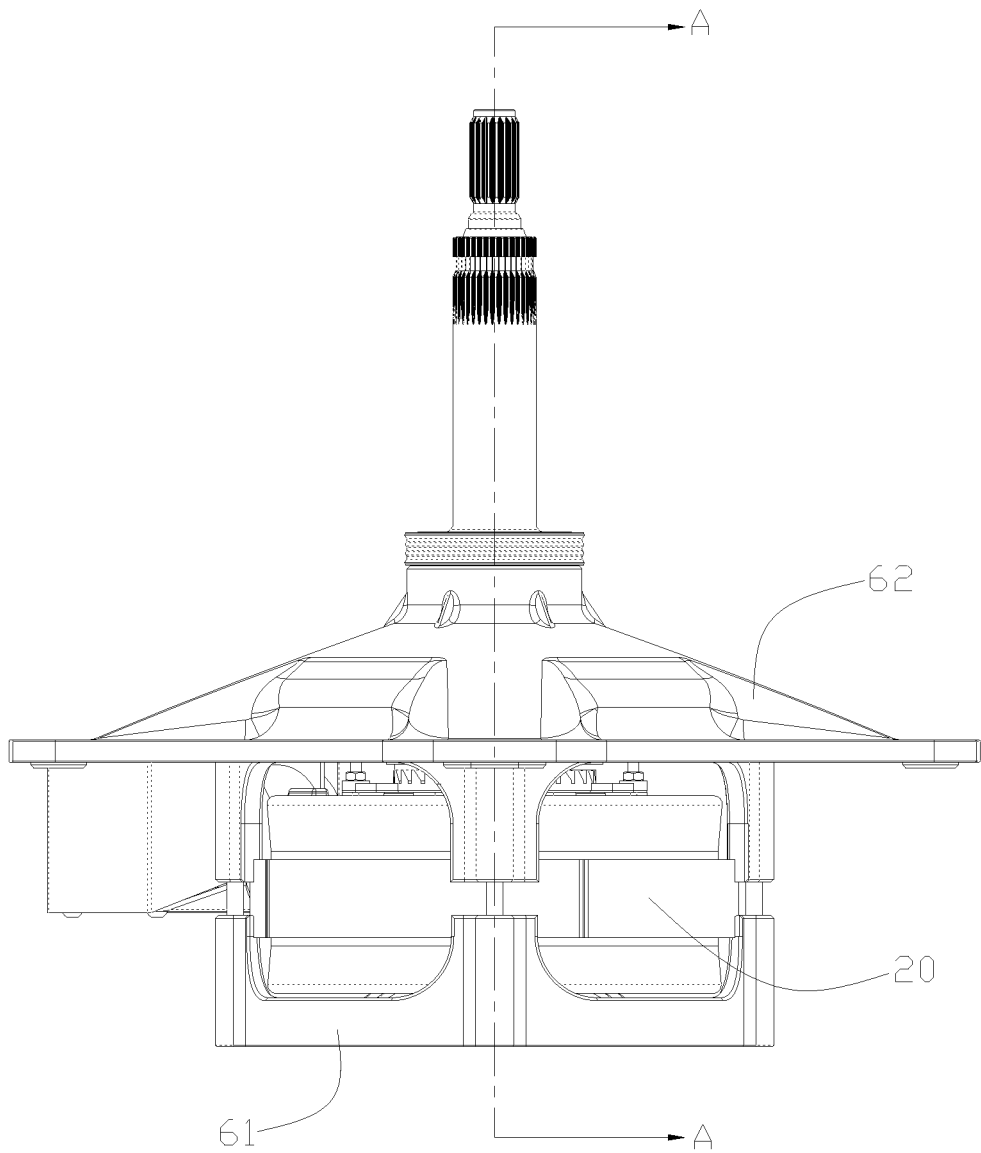
FIG. 2 is a front view of an embodiment of a drive device for a washing machine according to the present application.
Figure 3:
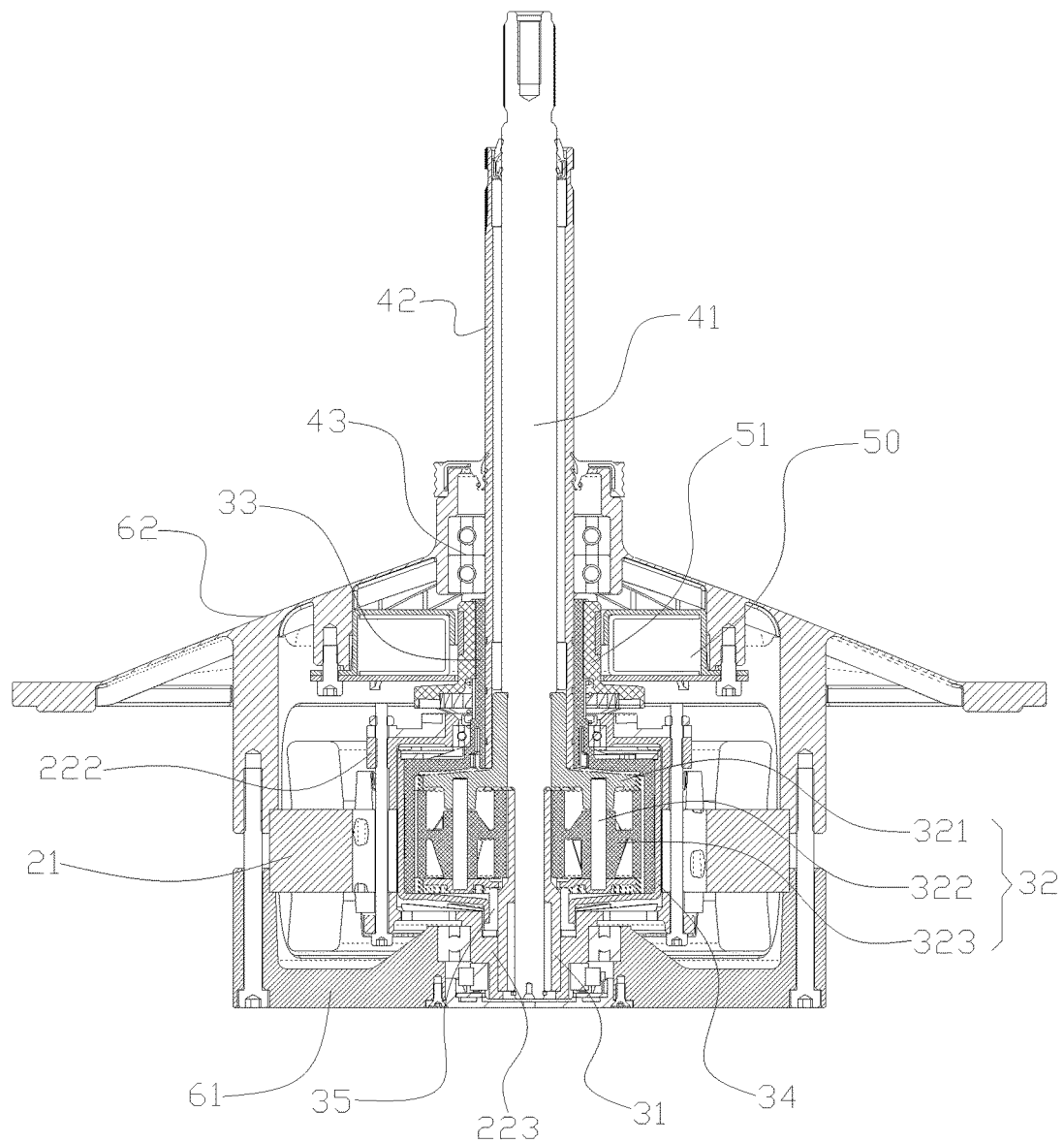
FIG. 3 is a sectional view of the drive device for the washing machine in FIG. 2 taken along direction A-A.

Referring to FIGS. 2 to 3, FIG. 2 is a front view of an embodiment of a drive device for a washing machine according to the present application; and FIG. 3 is a sectional view of the drive device for the washing machine in FIG. 2 taken along direction A-A.

In this embodiment, the drive device for the washing machine includes a motor 20, and the motor 20 includes a stator 21 and a rotor 22 coaxially arranged in the stator 21.

A mounting plate 62 is provided above the motor 20, a bottom cover 61 is provided below the motor 20, and the stator 21, the bottom cover 61, and the mounting plate 62 can be fixedly connected by bolts.

The drive device for the washing machine can be mounted on the washing machine by the mounting plate 62.

The rotor 22 includes a rotor body 221 having an inner cavity, that is, the rotor body 221 is a hollow structure. A rotor upper end cover 222 is provided above the rotor body 221, a rotor lower end cover 223 is provided below the rotor body 221, and the rotor body 221, the rotor upper end cover 222 and the rotor lower end cover 223 can be fixedly connected by bolts.

A washing shaft 41 for the washing machine is coaxially installed in the rotor 22, and a rotor oil-retaining bearing is arranged between the washing shaft 41 and the rotor 22. The washing shaft 41 limits the position of the rotor 22 in a radial direction, and the relative rotation between the washing shaft 41 and the rotor 22 is achieved by the rotor oil-retaining bearing.

The dewatering shaft sleeve 42 of the washing machine is sleeved on the washing shaft 41, and a washing shaft oil-retaining bearing is arranged between the dewatering shaft sleeve 42 and the washing shaft 41, to allow the dewatering shaft sleeve 42 and the washing shaft 41 to be rotatable with respect to each other.

The washing shaft 41 is connected to an impeller of the washing machine, and the dewatering shaft sleeve 42 is connected to an inner drum of the washing machine.

Figure 4:
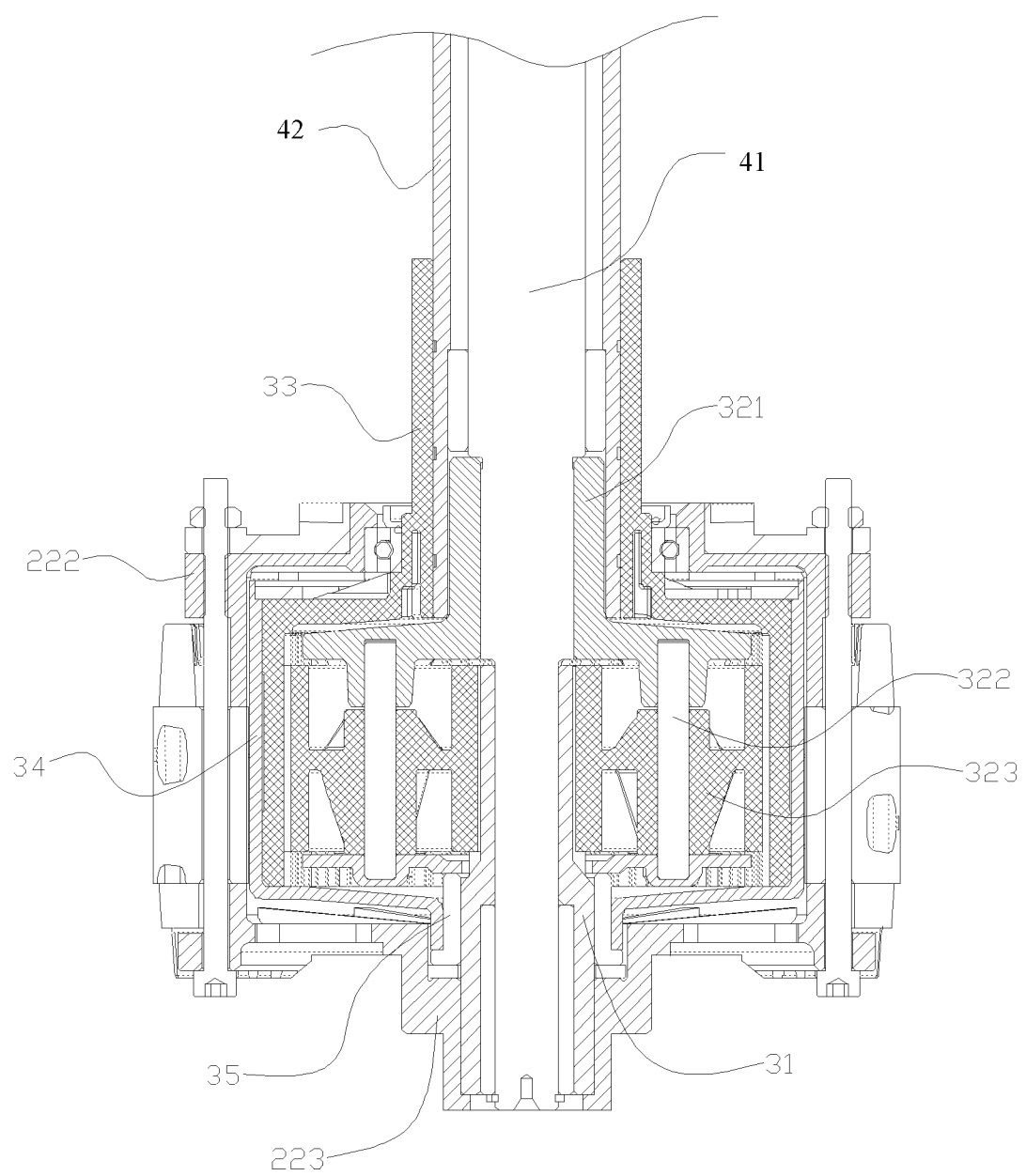
FIG. 4 is a structural schematic view showing the cooperation between a rotor and a planetary gear speed reduction mechanism in FIG. 3.
Figure 5:
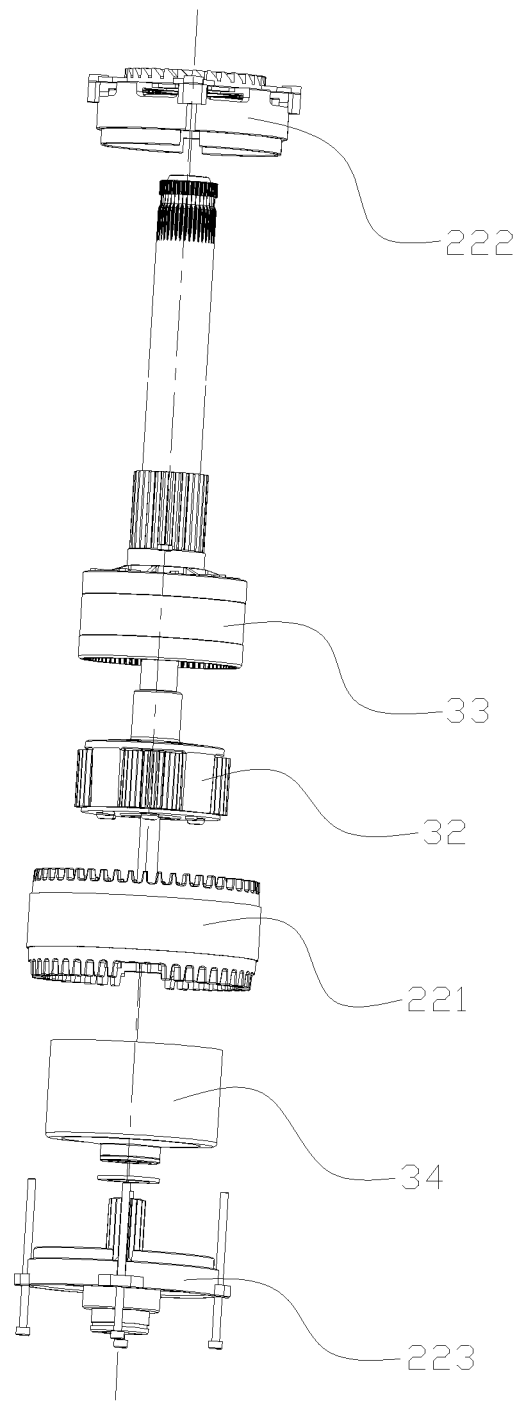
FIG. 5 is a schematic exploded view of the rotor and the planetary gear speed reduction mechanism in FIG. 3.

Referring to FIGS. 4 and 5, FIG. 4 is a structural schematic view showing the cooperation between the rotor and a planetary gear speed reduction mechanism in FIG. 3; FIG. 5 is a schematic exploded view of the rotor and the planetary gear speed reduction mechanism in FIG. 3.

The drive device for the washing machine further includes a planetary gear speed reduction mechanism built in the rotor body 221. The planetary gear speed reduction mechanism includes a sun-gear sleeve 31, a planetary gear assembly 32 and an internally toothed ring gear 33.

The sun-gear sleeve 31 is sleeved on the washing shaft 41, and is fixedly connected to the rotor 22.

The sun-gear sleeve 31 may be fixedly connected to the rotor lower end cover 223.

The planetary gear assembly 32 includes a planetary carrier 321, a planet pin 322 inserted in the planetary carrier 321, and a planetary gear 323 sleeved on the planet pin 322.

The planetary carrier 321 is fixedly connected to the washing shaft 41. The planetary carrier 321 and the washing shaft 4 may be fixedly connected by splined connection, and of course may also be fixedly connected by other fixed connection manners.

The planetary gear 323 meshes with the sun-gear sleeve 31.

Multiple planetary gears 323 are provided and are evenly distributed about the sun-gear sleeve 31.

The internally toothed ring gear 33 meshes with the planetary gears 323, and is fixedly connected to the dewatering shaft sleeve 42.

In practical arrangement, the sun-gear sleeve 31 may be made of a metal part, and the planetary gears 323 and the internally toothed ring gear 33 may be made of high-temperature resistant plastic, which can reduce noise while ensuring the operation reliability.

Figure 6:
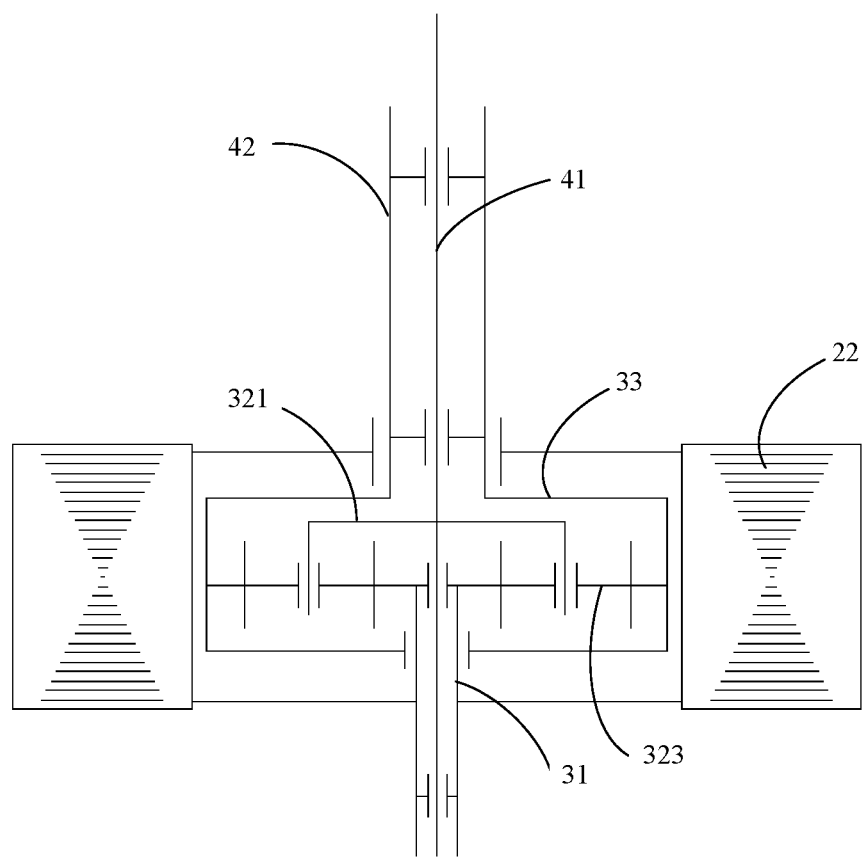
FIG. 6 is a schematic view showing the transmission of the drive device for the washing machine in FIG. 2.

Reference is made to FIG. 6, which is a schematic view showing the transmission of the drive device for the washing machine in FIG. 2.

In operation, the motor 20, after being energized, drives the rotor 22 to rotate, and meanwhile drives the sun-gear sleeve 31 fixedly connected to the rotor 22 to rotate. Since the planetary gears 323 mesh with the sun-gear sleeve 31, the planetary gears 323 may be driven to rotate on its own axis and simultaneously revolve about a central axis of the planetary gear speed reduction mechanism, and the washing shaft 41 is driven by the planetary carrier 321 to output at a low speed. The planetary gears 323, when rotating, drive the internally toothed ring gear 33 meshing with the planetary gears 323 to spin, thus driving the dewatering shaft sleeve 42 to output at a low speed.

In this solution, the dewatering shaft sleeve 42 and the washing shaft 41 rotate in opposite directions.

In the drive device for the washing machine, the planetary gear speed reduction mechanism is built in the rotor 22, and the sun gear of the planetary gear speed reduction mechanism is configured as a gear sleeve, and is sleeved on the washing shaft 41 coaxial with the rotor 22, and multiple planetary gears are evenly distributed in the inner cavity of the rotor body 221. In this way, the planetary gear speed reduction mechanism is coaxial with the rotor 22, which ensures the smoothness of the operation of the rotor 22, and ensures that power can be inputted and outputted coaxially, thus effectively improving the efficiency of the whole machine. In addition, compared with the background technology, the planetary gear speed reduction mechanism has a more compact structure, and may have a reduced axial dimension, and multiple planetary gears 223 are evenly distributed, which can bear the load together, thus the gears are enabled to have a large contact area, which effectively disperses the gear surface pressure, and can increase the reliability of the operation of the planetary gear speed reduction mechanism.

In a specific arrangement, the number of the planetary gears 323 may be three or four, and the specific number of the planetary gears 323 is not limited, as long as the planetary gears 323 are evenly distributed in the inner cavity of the rotor 22. In this way, the adverse effects to the rotor 22 caused by an unbalance force can be reduced, which further improves the operation performance of the whole machine.

Further, a ring gear retaining sleeve 34 is provided between the rotor 22 and the internally toothed ring gear 33.

Since the inside of the rotor 22 has a high temperature, by providing the ring gear retaining sleeve 34, it can realize an effect of preventing the internally toothed ring gear 33 from being thermally deformed when the planetary gear speed reduction mechanism operates in a loaded state, to protect the gears and improve the service life of the planetary gear speed reduction mechanism.

In addition, the ring gear retaining sleeve 34 may also have an effect of sealing the planetary gear speed reduction mechanism, and preventing the leakage of the lubricating grease of the planetary gear speed reduction mechanism, to ensure the normal operation of the rotor 22.

In a specific arrangement, the ring gear retaining sleeve 34 may be made of a metal material.

Further, an oil-retaining bearing 35 is further provided between the ring gear retaining sleeve 34 and the sun-gear sleeve 31.

In this way, the stability of the operation of the planetary gear speed reduction mechanism can be further improved, and the performance of the whole machine can be enhanced.

Further, the drive device for the washing machine further includes a clutch device, to achieve the switch between a washing operation mode and a dewatering operation mode.

In a specific solution, the clutch device is configured as an electromagnetic clutch device 50.

The clutch disc 51 of the electromagnetic clutch device 50 is sleeved on the internally toothed ring gear 33, and is axially slidable with respect to the dewatering shaft sleeve 42. It is to be noted that, the clutch disc 51 and the internally toothed ring gear 33 cannot rotate with respect to each other.

Other components of the electromagnetic clutch device 50, such as a coil, are fixed to the mounting plate 62, and specifically, may be fixedly connected to the mounting plate 62 by bolts.

In a specific arrangement, a compression spring is provided between the clutch disc 51 and the rotor 22.

The electromagnetic clutch device 50 generates a magnetic field after being energized, and the clutch disc 51 can overcome an elastic force of the compression spring to slide downward axially, to allow the clutch disc 51 to engage with the rotor 22. Since the clutch disc 51 and the internally toothed ring gear 33 cannot rotate with respect to each other, in this case, the internally toothed ring gear 33 is locked with respect to the rotor 22, causing the planetary gear speed reduction mechanism to be self locked, and the washing shaft 41 and the rotor 22 can rotate at the same speed, thus achieving the dewatering function.

In a practical arrangement, the clutch disc 51 can engage with the rotor upper end cover 222.

After the electromagnetic clutch device 50 is de-energized, the magnetic field disappears, and under the effect of the elastic force of the compression spring, the clutch disc 51 slides upward axially, to disengage the clutch disc 51 from the rotor 22. Thus, the planetary gear speed reduction mechanism can allow the washing shaft 41 to output at a low speed, to achieve the washing function.

As described above, when the electromagnetic clutch device 50 is energized, the washing machine is in the dewatering working condition, and since compared with the washing working condition, the dewatering working condition requires a shorter time, thus, the above arrangement can reduce the powered-on time of the electromagnetic clutch device 50, thereby saving the energy consumption cost.

Of course, in an arrangement, the compression spring is arranged at an upper side of the clutch disc, such that when the electromagnetic clutch device is de-energized, the clutch disc is engaged with the rotor under the action of the elastic force of the compression spring, to achieve the dewatering function. When the electromagnetic clutch device is energized, the clutch disc overcomes the elastic force of the compression spring to move upward axially, to be disconnected from the rotor, to achieve the washing function. The above arrangement is also feasible.

In such an arrangement, in the washing working condition, the electromagnetic clutch device is energized, which is apt to increase energy consumption cost compared with the aforementioned solution. Based on a comprehensive consideration, in practical arrangement, the former solution may be preferably employed.

Here, it is to be noted that, in addition to the above electromagnetic clutch device 50, the clutch device may also be configured as a mechanical clutch device.

For enabling the washing shaft 41 and the dewatering shaft sleeve 42 to rotate more stably in the dewatering working condition, a double bearing 43 is provided between the dewatering shaft sleeve 42 and the mounting plate 62.

The provision of the double bearing 43 can effectively prevent an imbalance force from being applied onto the rotor 22 caused by the swaying of the inner drum of the washing machine, and increase the rigidity of the whole structure.

In addition, a bearing is provided between the rotor lower end cover 223 and the bottom cover 61, to enable the rotor 22 to operate more stably.

A drive device for the washing machine according to the present application is described in detail hereinbefore. The principle and the embodiments of the present application are illustrated herein by specific examples. The above description of examples is only intended to help the understanding of the method and concept of the present application. It should be noted that, for the person skilled in the art, a few of modifications and improvements may be made to the present application without departing from the principle of the present application, and these modifications and improvements are also deemed to fall into the scope of protection of the present application defined by the claims.

What is claimed is:

1. A drive device for a washing machine, comprising a motor, a washing shaft, a dewatering shaft sleeve sleeved on the washing shaft, the washing shaft being coaxially installed on a rotor of the motor, wherein the drive device further comprises a planetary gear speed reduction mechanism built in the rotor, and the planetary gear speed reduction mechanism comprises:
    a sun-gear sleeve sleeved on the washing shaft and fixedly connected to the rotor;
    a planetary gear assembly, comprising a planetary gear meshing with the sun-gear sleeve, wherein the planetary gear assembly being fixedly connected to the washing shaft via a planetary carrier; the number of planetary gears is plural, and the plurality of the planetary gears are evenly distributed about the sun-gear sleeve; and
    an internally toothed ring gear meshing with the planetary gears and fixedly connected to the dewatering shaft sleeve.

2. The drive device for the washing machine according to claim 1, wherein a ring gear retaining sleeve is provided between the rotor and the internally toothed ring gear.

3. The drive device for the washing machine according to claim 2, wherein an oil-retaining bearing is provided between the ring gear retaining sleeve and the sun-gear sleeve.

4. The drive device for the washing machine according to claim 3, wherein a mounting plate is fixedly arranged above the motor, and a double bearing is provided between the mounting plate and the dewatering shaft sleeve.

5. The drive device for the washing machine according to claim 3, wherein the drive device further comprises a clutch device, to achieve a switch between a washing working condition and a dewatering working condition.

6. The drive device for the washing machine according to claim 5, wherein the clutch device comprises a clutch disc sleeved on the internally toothed ring gear and being axially slidable with respect to the internally toothed ring gear.

7. The drive device for the washing machine according to claim 6, wherein in the dewatering working condition, the clutch disc is engaged with the rotor.

8. The drive device for the washing machine according to claim 7, wherein the clutch device is an electromagnetic clutch device.

9. The drive device for the washing machine according to claim 2, wherein a mounting plate is fixedly arranged above the motor, and a double bearing is provided between the mounting plate and the dewatering shaft sleeve.

10. The drive device for the washing machine according to claim 2, wherein the drive device further comprises a clutch device, to achieve a switch between a washing working condition and a dewatering working condition.

11. The drive device for the washing machine according to claim 10, wherein the clutch device comprises a clutch disc sleeved on the internally toothed ring gear and being axially slidable with respect to the internally toothed ring gear.

12. The drive device for the washing machine according to claim 11, wherein in the dewatering working condition, the clutch disc is engaged with the rotor.

13. The drive device for the washing machine according to claim 12, wherein the clutch device is an electromagnetic clutch device.

14. The drive device for the washing machine according to claim 13, wherein when the electromagnetic clutch device is energized, the clutch disc is engaged with the rotor.

15. The drive device for the washing machine according to claim 1, wherein a mounting plate is fixedly arranged above the motor, and a double bearing is provided between the mounting plate and the dewatering shaft sleeve.

16. The drive device for the washing machine according to claim 1, wherein the drive device further comprises a clutch device, to achieve a switch between a washing working condition and a dewatering working condition.

17. The drive device for the washing machine according to claim 16, wherein the clutch device comprises a clutch disc sleeved on the internally toothed ring gear and being axially slidable with respect to the internally toothed ring gear.

18. The drive device for the washing machine according to claim 17, wherein in the dewatering working condition, the clutch disc is engaged with the rotor.

19. The drive device for the washing machine according to claim 18, wherein the clutch device is an electromagnetic clutch device.

20. The drive device for the washing machine according to claim 19, wherein when the electromagnetic clutch device is energized, the clutch disc is engaged with the rotor.

* * * * *